July 31, 1945. E. A. ZEMPEL 2,380,628
METAL STOCK HAVING A SQUARE HOLE AND
METHOD OF MAKING SAID STOCK
Filed May 14, 1943 2 Sheets-Sheet 1

INVENTOR.
E. A. Zempel
BY
ATTORNEYS

July 31, 1945.　　　　E. A. ZEMPEL　　　2,380,628
METAL STOCK HAVING A SQUARE HOLE AND
METHOD OF MAKING SAID STOCK
Filed May 14, 1943　　　2 Sheets-Sheet 2

Inventor
E. A. Zempel

Patented July 31, 1945

2,380,628

UNITED STATES PATENT OFFICE 2,380,628

METAL STOCK HAVING A SQUARE HOLE AND METHOD OF MAKING SAID STOCK

Edward A. Zempel, Milwaukee, Wis.

Application May 14, 1943, Serial No. 486,985

6 Claims. (Cl. 29—148)

This invention appertains to metal working and more particularly to the novel method of making or producing an accurate square hole or aperture in metal stock, such as, by the way of example, a square hole in a boring bar for the reception of the tool or cutter.

Much difficulty is experienced in producing an accurate square hole in metal, particularly relatively hard metal and where the metal stock is cylindrical the difficulty is increased. Where the hole or aperture has to be an exact size for receiving a working part, the making thereof is almost impossible and must be performed by a highly skilled master mechanic or tool maker. This operation can only then be accomplished by lengthy and tedious labor.

The usual practice is to bore a circular hole of the desired size and then use drifting tools to make the corners of the square, after which the walls of the opening are filed smooth and to size.

It is therefore, one of the primary objects of my invention to provide a novel method whereby square openings or holes of an exact desired size can be quickly and easily made by the ordinary machinist with a minimum amount of labor.

Another salient object of my invention is the provision of a novel method of forming or producing a square hole in metal stock which consists, first, in boring a circular hole in the stock to an exact size; second, machining a slot of a definite size in a metal strip; third, cutting the strip in half; fourth, fitting the two halves together so that the slot or groove in the halves will form a perfect square; and fifth, machining the fitted halves to perfectly fit the hole; and finally welding the machined fitted halves in the hole.

With these and other objects in view, the invention consists in the novel construction, arrangement and formation of parts, as will be hereinafter more specifically described, claimed, and illustrated in the accompanying drawings, in which drawings:

Figure 1:
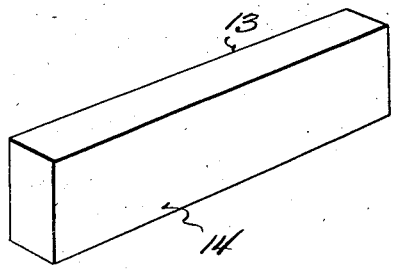
Figure 1 is a perspective view of a metal strip or bar utilized in producing the square hole or aperture.
Figure 2:
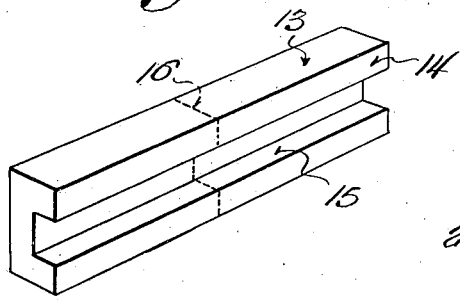
Figure 2 is a perspective view showing one of the steps in handling the strip to produce the square hole, in this view the strip being machined to produce a longitudinally extending rectangular shaped groove, the dotted line in said figure indicating where the strip is to be cut in half to produce two companion like sections.
Figure 3:
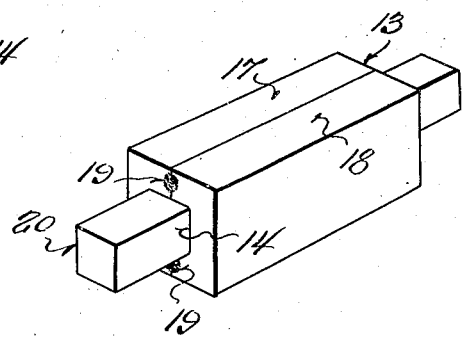
Figure 3 is a perspective view showing the next step of fitting the halves together around a sizing bar incident to the step of temporarily welding the halves or sections together, the figure showing the sections temporarily welded.
Figure 4:
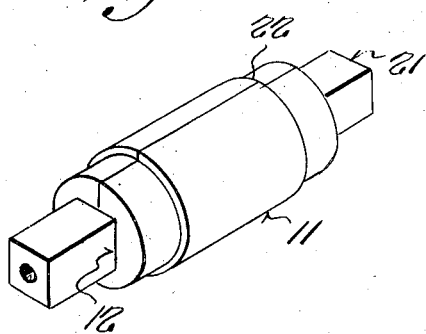
Figure 4 is a perspective view showing another step in my method and the particular step illustrating the halves on a centering mandril and machined to accurately fit an opening in a piece of metal stock and to produce stop shoulders.
Figure 5:
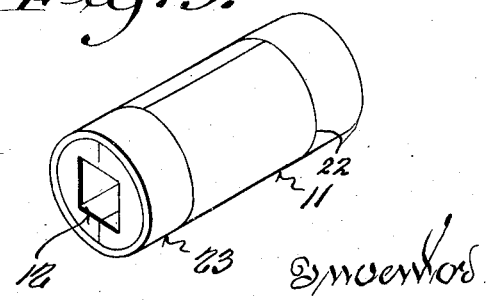
Figure 5 is a perspective view showing the complete insert for the circular hole in the metal stock, the halves being held together by collars or ferrules fitted against said shoulders.
Figure 6:
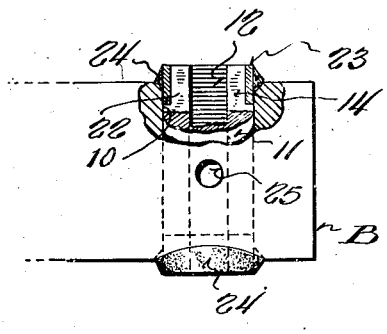
Figure 6 is a fragmentary, detail, side, elevational view of a boring bar showing the next step of producing a square hole therein, the insert being welded to said bar.
Figure 7:
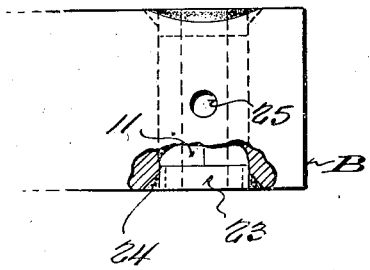
Figure 7 is a view similar to Figure 6 and showing the final step of machining off the ends of the insert and weld smooth.

Referring to the drawings in detail, wherein similar reference characters designate corresponding parts throughout the several views, the letter B generally indicates the forward end of a boring bar (see Figures 6 and 7). The boring bar has only been shown by way of example and the same can be considered as any kind of metal stock.

The first step in my method is to bore an opening 10 through the stock or bar B to an exact desired size. The method now proceeds to produce an insert 11 to be welded in said opening to form an integral part of the stock or bar having an accurate sized square hole 12 therethrough.

The method of producing the insert 11 consists first, taking an elongated metal strip 13 and machining one face 14 thereof perfectly smooth and flat. This face 14 is now machined to produce a longitudinally extending rectangular groove 15. This groove is also machined to an exact size and depth. The strip 13 is then cut exactly in half along the dotted line 16 to produce two companion like sections or halves 17 and 18. The faces 14 of the halves or sections are placed together and the groove 15 is so machined that the same will produce the square opening 12 in the complete insert 11.

The two halves 17 and 18 are temporarily secured together so that the same can be machined at the same time as a unit or block to produce a round cylinder to accurately fit the hole 10 in the stock or bar B.

In order to secure the halves 17 and 18 temporarily together the same are welded at the ends, as at 19. This can be easily accomplished by fitting the halves or sections around a square sizing bar 20 formed from a metal which will not readily take a weld. After the welding operation is completed the sizing bar 20 is removed and a centering mandril 21 is inserted in the square opening in lieu of the sizing bar. The centering mandril 21 facilitates the placing of the connected two halves on a lathe and, as stated, the two halves are then machined to produce the cylinder which will accurately fit the opening 10, as heretobefore stated. The halves or sections are also machined at this time to reduce the ends of the cylinder and to form stop shoulders 22. The ends of the cylinder are also machined off so as to eliminate the temporary weld 19.

Sleeves, collars, or ferrules 23 of an exact size are slipped on the reduced ends of the cylinder against the shoulders 22 and these sleeves function to hold the machined halves or sections together. The complete insert 11 is now ready to be inserted in the opening 10.

Prior to the placing of the insert or unit 11 in the opening, the wall of the opening at the ends thereof is beveled or flared, as at 24, for a purpose which will now be fully described.

After the unit has been placed in the opening, the unit 11 is welded rigidly in the stock or bar B and the welding metal flows into the flared ends of the opening around the unit or insert.

Figure 8:
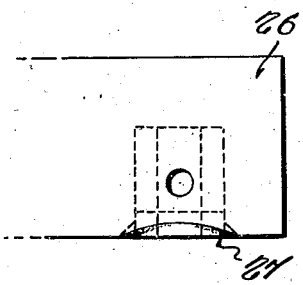
Figure 8 is a fragmentary, detail, side, elevational view of a boring bar or a piece of metal stock showing my method of producing a square hole therein to a limited distance.
Figure 9:
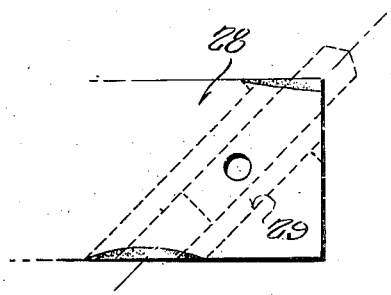
Figure 9 is a fragmentary, side, elevational view of a boring bar showing how a diagonally extending square hole can be produced in a boring bar according to my method.

The final step is the accurate machining off of the ends of the unit or insert flush with the outer face of the stock or bar B. The finishing off is such that the weld and insert are hardly visible to the eye.

Where a boring bar has been made according to this method, the same is now ready to receive the square shanks of cutters and the boring bar and the insert or unit are provided with aligned internally threaded openings 25 for a set screw to hold the cutters in place.

Where square openings have to be made in hard metal stock, that do not extend entirely through the stock, extreme difficulty is encountered. However, with my novel method the square opening can be accurately and easily made and in Figure 8 I have shown such a square opening in a boring bar 26. The exact method described above is followed except that the round opening in the bar is only made a certain depth and, naturally, only the protruding end of the unit or insert is welded, as at 27, to the bar or other stock. Likewise, only one holding sleeve can be utilized if so desired. Likewise, difficulty is encountered in making a square hole diagonally through a piece of metal stock or boring bar and this operation can be easily and quickly accomplished by means of my method. In Figure 9 I have shown a boring bar 28 provided with a diagonally extending round opening 29 and the insert, made in accordance with the method described, is placed and welded in said opening.

While I have shown and described the insert secured in the metal stock or bar by a weld, as such is preferred, it is to be understood that the insert can be rigidly held in place in the stock or bar by means of pins, keys, or similar appliances.

Changes in details may be made without departing from the spirit or the scope of my invention, but what I claim as new is:

1. The method of producing an accurate square hole in metal stock, which consists in first, boring a circular hole in the stock, second, forming mating rectangular grooves twice as wide as deep in the inner faces of companion strips, third, fitting these strips together face to face to provide, by means of the grooves, a square hole between the fitted strips, fourth, temporarily welding the ends of the strips together by inserting a square sizing bar between the strips which will not readily take a weld, fifth, substituting a centering mandril for the sizing bar and placing the secured strips by means of the mandril in a lathe and machining the outer face of the fitted strips to accurately fit the hole and, finally fitting and anchoring the fitted machined strips in said hole.

2. The method of producing an accurate square hole in metal stock, which consists in first, boring a circular hole in the stock, second, forming mating rectangular grooves twice as wide as deep in the inner faces of companion strips, third, fitting these strips together face to face to provide a square hole between the fitted strips, fourth, temporarily securing the fitted strips together, fifth, machining the outer faces of the fitted strips to accurately fit the circular hole and to provide shouldered terminals, sixth, removing the temporary weld, seventh, fitting holding sleeves on the reduced ends of the fitted strips flush with the main outer face of the strips, and finally fitting the resultant product in the hole and securing the same to the stock as an integral part thereof.

3. The method of producing an accurate square hole in metal stock, which consists in first, boring a circular hole in the stock, second, forming mating rectangular grooves twice as wide as deep in the inner faces of companion strips, third, fitting these strips together face to face to provide a square hole between the fitted strips, fourth, temporarily securing the fitted strips together, fifth, machining the outer faces of the fitted strips to accurately fit the circular hole and to provide shouldered terminals, sixth, removing the temporary weld, seventh, fitting holding sleeves on the reduced ends of the fitted strips flush with the main outer face of the strips, and finally fitting the resultant product in the hole and securing the same to the stock as an integral part thereof by means of a weld.

4. The method of producing an accurate square hole in metal stock, which consists in first, boring a circular hole in the stock, second, machining one face of a metal strip and forming a longitudinally extending rectangular groove twice as wide as deep therein, third, cutting the strip in half and fitting the machined faces of the halves together, fourth, temporarily securing the halves together as a unit, fifth, machining the unit to fit the hole in the stock and to form reduced shouldered ends, sixth, removing the temporary securing means, seventh, holding the unit together by sleeves placed on the shouldered ends flush with the outer face of the unit, eighth, fitting the unit in the hole, and ninth, welding the unit to the stock.

5. The method of producing an accurate square hole in metal stock, which consists in first, boring a circular hole in the stock, second, machining one face of a metal strip and forming a longitudinally extending rectangular groove twice as wide as deep therein, third, cutting the strip in half and fitting the machined faces of the halves together, fourth, temporarily securing the halves together as a unit, fifth, machining the unit to fit the hole in the stock and to form reduced shouldered ends, sixth, removing the temporary securing means, seventh, holding the unit together by sleeves placed on the shouldered ends flush with the outer face of the unit, eighth, fitting the unit in the hole, ninth, welding the unit to the stock, and finally machining the unit and weld smooth with the outer face of the stock.

6. As a new article of manufacture, a piece of metal stock having a circular opening extending therein, a pair of facing strips having longitudinally extending rectangular grooves fitted together and anchored in said opening, said strips having their outer ends reduced, sleeves fitted on said reduced ends and welding connecting the sleeves to the stock.

EDWARD A. ZEMPEL.